Figure 1:
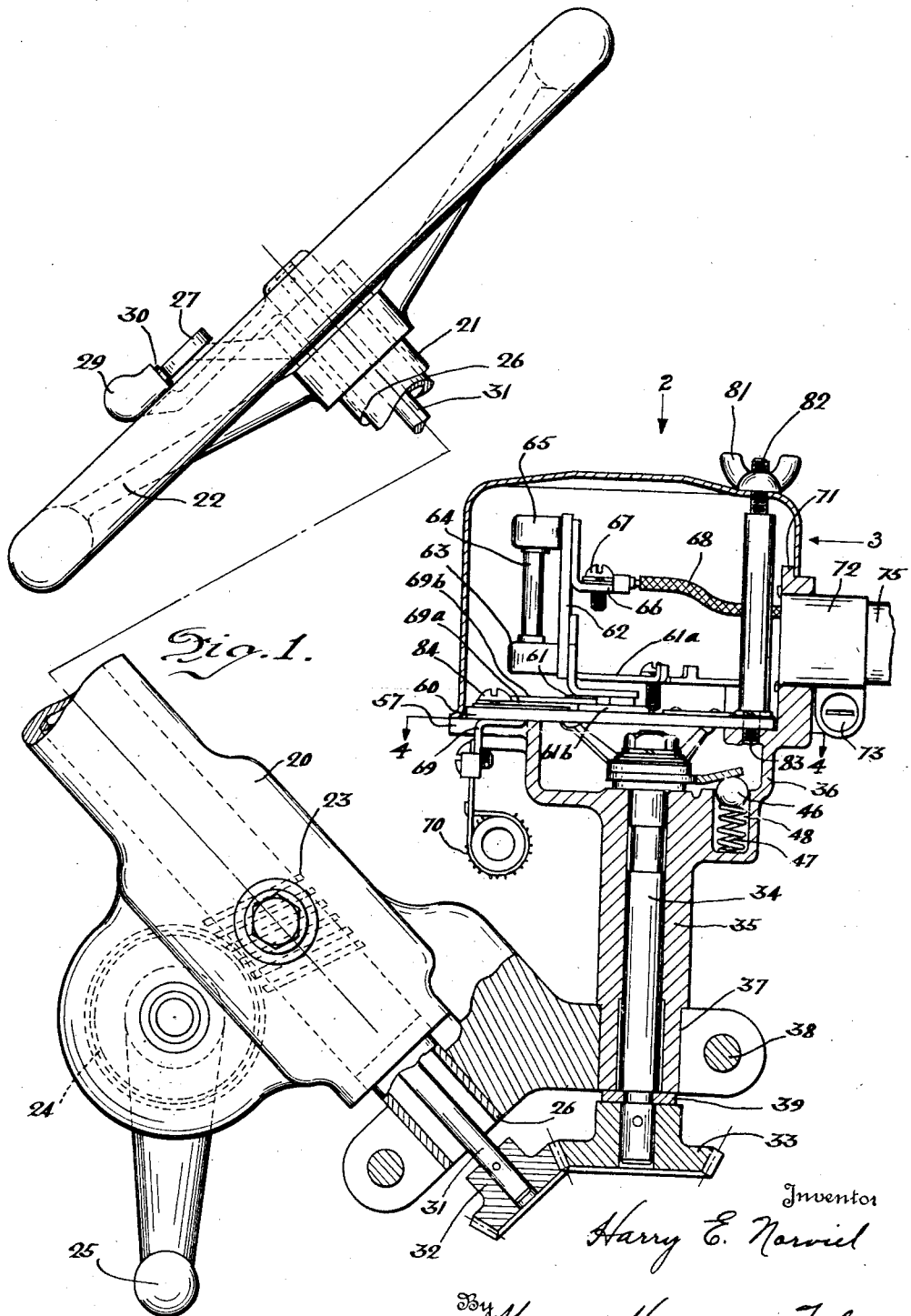

April 21, 1931.  H. E. NORVIEL  1,801,610
ELECTRIC SWITCH
Original Filed Aug. 12, 1924  2 Sheets-Sheet 1

Inventor
Harry E. Norviel
By Spencer Hardman & Fehr
his Attorneys

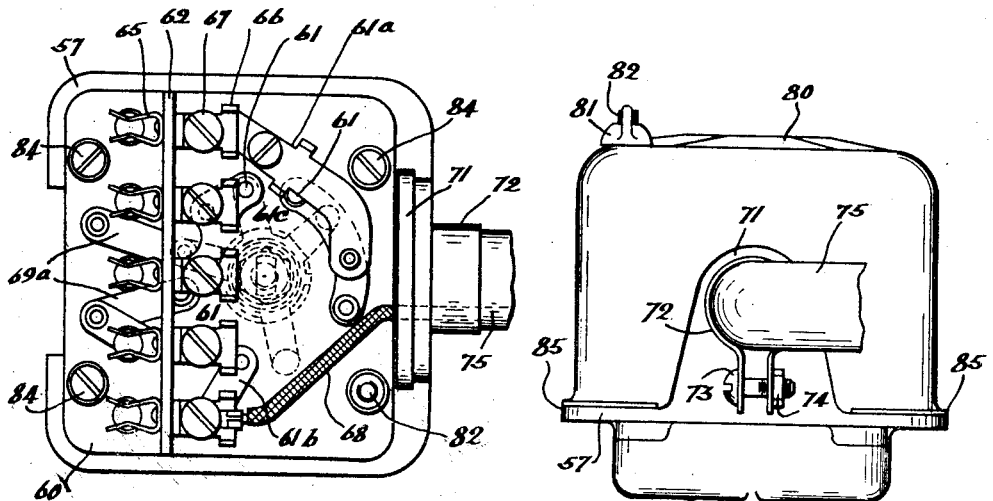
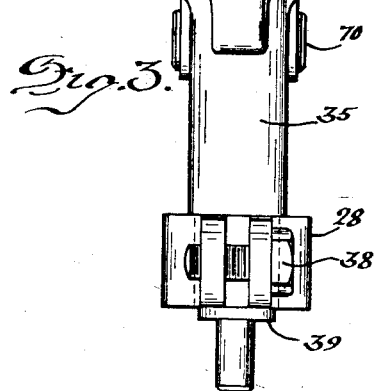
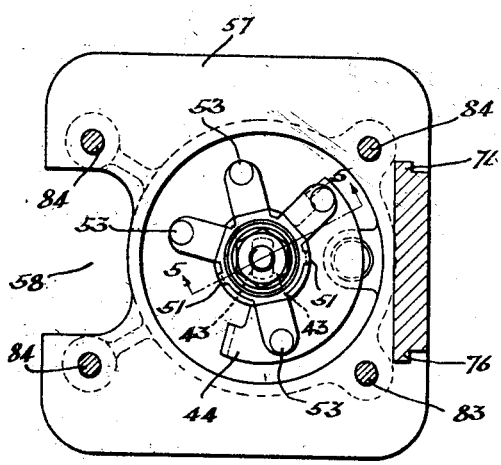
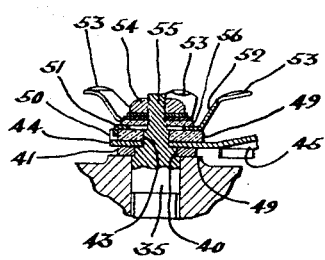

Patented Apr. 21, 1931

1,801,610

UNITED STATES PATENT OFFICE

HARRY E. NORVIEL, OF ANDERSON, INDIANA, ASSIGNOR TO DELCO-REMY CORPORATION, OF DAYTON, OHIO, A CORPORATION OF DELAWARE

ELECTRIC SWITCH

Original application filed August 12, 1924, Serial No. 731,691. Divided and this application filed October 31, 1927. Serial No. 229,869.

This invention relates to electrical switches for controlling certain electrical circuits of the automobiles such as the lighting circuits.

This application is a division of my copending application Serial No. 731,691, filed August 12, 1924.

One of the objects of the present invention is to control electrical circuits by means of a lever mounted on the steering column and preferably above the steering wheel. In carrying out this object the invention provides an electric switch adapted to be conveniently mounted upon the lower end of the steering column and under the engine hood, the switch being readily accessible for making electrical connections therewith and for replacement of parts thereof.

Further objects and advantages of the present invention will be apparent from the following description, reference being had to the accompanying drawings, wherein a preferred embodiment of one form of the present invention is clearly shown.

Fig. 1 of the drawings is a fragmentary view of the steering column and steering gear housing, and a sectional view of a form of switch embodying the present invention. Fig. 2 is a top plan view in the direction of the arrow 2 of Fig. 1, with the switch cover removed. Fig. 3 is a side view of the switch in the direction of the arrow 3 in Fig. 1. Fig. 4 is a sectional view on the line 4—4 of Fig. 1; and Fig. 5 is a sectional view on the line 5—5 of Fig. 4.

Referring to the drawings; 20 designates a steering gear housing attached in the usual manner to the frame (not shown) of an automobile. This housing is provided with bearings (not shown) in which is journalled the one end of the steering column 21, the other end thereof having the steering wheel 22 attached thereto. The steering gearing positioned within the housing 20 comprises a worm 23 secured to the steering column, which meshes with a gear 24 having the steering arm 25 connected therewith. The steering column 21 is of tubular construction for receiving a tube 26, having the control sector secured thereto, preferably, above the steering wheel. The other end of said tube 26 extends out of the housing 20 and is rigidly clamped in the contractible, extending member 28a of the bracket 28 which may be attached to, but is shown integral with the housing 20. A lever 29 carrying a spring-pressed plunger 30 for frictionally engaging the sector 27 is connected with the upper end of a rod 31 extending centrally through the tube 26. At its lower end the rod 31 is connected with a gear 32 meshing with a gear 33 connected with the switch shaft 34. Shaft 34 is journalled in the shank 35 of a cup-shaped switch housing 36. The shank 35 is provided with a reduced portion 37 which is clamped by screw 38 to the bracket 28.

Shaft 34 carries a washer 39 located between the gear 33 and the shank 35 for resisting upward movement of the shaft 34. Shaft 34 is provided with a reduced portion 40 for carrying a washer 41 which rests upon the bearing boss 42 of housing 36 and resists downward movement of the shaft 34. Above the reduced portion 40, the shaft 34 is provided with flats 43 which enter a corresponding oblong hole provided in detent plate 44 which is formed adjacent its periphery to provide a plurality of notches 45 each of which is adapted to receive a detent ball plunger 46 which is urged upwardly as viewed in Fig. 1, by a spring 47 located in a socket 48 provided by the housing 36. The flatted portions 43 of shaft 35 are received also by a corresponding oblong hole in a nonconducting washer 49 provided with notches 50. The notches 50 receive prongs 51 projecting from a switch spider 52 having a plurality of resilient contacts 53. The spider is retained on the shaft 34 by nut 54 which cooperates with a threaded end 55 of the shaft 34 and clamps the spider between the non-conducting washer 49 and a nonconducting washer 56.

A flange 57 extends from the housing 36 for supporting a nonconducting terminal block 60 which cooperates with the housing 36 to inclose the switch contacts. Flange 57 is provided with a notch 58 extending from one side edge thereof to the exterior of the housing 36. The block 60 supports a plurality of stationary contacts 61, each adapted to be engaged by certain ones of the movable contacts 53. Some of the contacts 61 are connected, respectively, with conducting brackets 61a, 61b and 61c which support a fuse block 62 and which are each connected with one of the fuse lower terminal clips 63. Each clip 63 receives the lower terminal of a fuse 64 having its upper end terminal engaged by fuse terminal clips 65. Each clip 65 is connected with a wire-receiving terminal 66 cooperating with a screw 67 for attaching a wire 68 which leads to one of the electrical circuits controlled by the switch handle 29. The terminal block 60 supports brackets, one of which is shown at 69, which are connected with the terminals of a resistance coil 70 for dimming the headlights of the automobile.

Each bracket 69 is connected by a strap 69a with one of the stationary contacts 61, and one of the brackets 69 is connected by a strap 69b with one of the fuse clips 63. As the exact size and dimensions of each conducting strap and bracket, and the spacing of the stationary contacts 61 depends largely on the nature of the circuits to be controlled by the switch, no further detailed consideration of these parts is deemed necessary.

An apertured lug 71 extends from the flange 57 and is attached to a clamp 72 which cooperates with a screw 73 and nut 74 for clamping to the switch case a flexible metallic tube 75 for inclosing and protecting the various wires 68 leading from the switch to various work circuits of the automobile and to the battery or other current source.

The switch terminals and fuses are inclosed by a cover 80 which is clamped against the flange 57 by a wing nut 81 which cooperates with a stud 82 extending through a hole in the top of the cover 80, and having its lower end reduced in diameter and threaded at 83 for extending through a hole in the terminal block 60 and for screwing into a hole tapped in the switch housing 36. In this manner the stud 82 serves the double purpose of securing means for the cover 80 and securing means for one corner of the switch terminal block 60. The other three corners of the terminal block are secured by screws 84, which engage tapped holes in the switch housing 36.

The cover 80 is notched to receive the lug 71 which is provided with a groove 76 which is coextensive with the periphery of the extension 71. The edge of the cover 80 is received by the groove 76 and the bottom edge of the cover is flanged at 85 for engagement with the flange 57 to prevent the admission of dirt and moisture to the switch terminals.

The switch terminals are rendered accessible for attaching or disconnecting wires, by removal of wing nut 81 and cover 80. The various screws 67 which attach the wires 68 to the switch terminals are all accessible for the ready application of a screw driver. The fuses 64 are accessible for replacement. The terminal block 60 with the switch terminals, fuses and dimmer resistance assembled thereon, is removable from the switch housing flange 57 while the housing remains assembled on the steering gear housing. After removing the screws 84 and the stud 82 the terminal block 60 may be lifted upwardly. The notch 58 in flange 57 is made wide enough to provide clearance for the removal of the dimmer resistance unit 70.

The present invention is particularly adapted for use in automobiles, which dispense with manual control of ignition timing. The lever at the top of the steering column, which is ordinarly used to control the ignition manually, is made use of by the present invention for controlling the lighting circuits. The sector 27 may be provided with indicia to denote the various circuit-making positions or the "off" position of the lever 29. By means of this invention the usual lighting switch on the instrument board is dispensed with and the wiring is substantially shortened. The switch connections are much more accessible than in the case where the connections are brought out in the rear of the instrument board of the automobile.

While the form of embodiment of the invention as herein disclosed, constitutes a preferred form, it is to be understood that other forms might be adopted, all coming within the scope of the claims which follow.

What is claimed is as follows:

1. A circuit controlling device comprising in combination, a cup-shaped housing having its rim flared outwardly to provide a flange, one portion thereof being apertured; an apertured lug extending angularly from said housing flange; a tubular shank on the housing for mounting it on a support; a plate of insulating material resting upon and secured to the housing flange, said plate forming a cover for the said housing, and the aperture in the flange thereof; conducting members including contact faces and terminal portions, supported on the plate so that the contact faces are flush with the inner surface and the terminals extend from the outer surface of said plate; a rotatable shaft journalled in the tubular shank and extending into the housing; a movable contact member secured on the shaft within the housing and adapted to be moved into circuit closing positions with the contact faces of the conducting members on the plate; a terminal secured to the plate so as to extend through the aperture in the flange of the housing; a resistance unit supported by said terminal; a clamping sleeve extending into the aperture of the angular lug of the housing flange and secured therein; said clamping sleeve being contractible and including means for drawing it into gripping engagement with a conduit adapted to extend thereinto; and a cap adapted to be secured to the flange of the housing and having an aperture to fit about the said flange lug, said cap and lug enclosing the terminals of the device.

2. A circuit controlling device comprising in combination, a case provided with a flange forming a plate; a cover for said case, made of insulating material, and secured to said plate; stationary contacts supported by said cover and having terminals extending therefrom; and a housing for said terminals, said housing including a part fixed to the plate, and apertured to receive a wire conduit, and a removable cap fitting about said part of the plate and attached to the case.

3. A circuit controlling device comprising in combination, a flanged housing; a cover plate of insulating material for said housing and attached to the flange thereof; contacts on the one side of the plate, electrically connected with terminals on the other side of the plate; an extending portion on the housing, apertured to receive a wire conduit; and a cap providing an enclosure for the terminals, said cap fitting about the extending portion and upon the cover plate to which it is secured.

4. A circuit controlling device comprising in combination, a housing; a cover plate of insulating material for said housing; contacts including terminal portions supported by said cover plate; means for securing the plate to the housing, said means including a post having a screw-threaded end extending through the plate and screw-threadedly connected to the housing; a cap providing an enclosure for the contact terminals, said cap fitting over the plate and being secured to the post.

5. A circuit controlling device comprising in combination, a housing; a cover plate of insulating material for said housing; contacts including terminal portions supported by said cover plate; an extending portion on the housing, apertured to receive a wire conduit; a post for securing the plate to the housing; said post having reduced end portions, screw-threaded, one of which extends through the plate and screw-threadedly engages the housing; a cap providing an enclosure for the contact terminals, said plate being apertured to fit over the extending portion of the housing and the reduced end of the post so as to rest upon the cover plate; and a nut on the post for holding said cap securely in position on the cover plate.

6. A circuit controlling device comprising in combination, a housing having an apertured flange; an insulating plate secured to the flange so as to provide a cover for the housing and the aperture in its flange; contacts including terminals supported by said plate; a bracket secured to the plate and extending through the aperture in the housing flange, said bracket having a terminal on the opposite side of the plate, connected therewith; an electrical work device carried by said bracket; and a cap adapted to rest upon the cover plate and be secured thereto, said cap providing an enclosure for the terminals on said plate.

7. A circuit controlling device comprising in combination, a switch case; contact members having terminals extending outside the switch case; and an enclosure for said terminals, the enclosure including an extending portion of the case, apertured to support a wire conduit, and a removable cap adapted to fit over the housing and its extending portion.

8. A circuit controlling device comprising in combination, a switch case; an insulating cover for said switch case; stationary contacts on the inside of said cover and having terminals on the outside of said cover, connected therewith; movable contacts in said switch case, adapted to cooperate with the stationary contacts to complete electrical circuits; an apertured extension on the switch case, adapted to receive and support a wire conduit; and a cap fitting over the apertured extension and attached to the case, providing an enclosure for the contact terminals.

9. A circuit controlling device comprising in combination, a switch case; an insulating plate secured to said case and forming a cover therefor; contacts including terminals supported by said plate; a bracket secured to the side of the plate engaging the switch case and outside the switch case, said bracket being connected with a terminal on the opposite side of said plate; an electric work device supported on the bracket; and a cap secured on the plate, said cap enclosing the contact and bracket terminals.

10. A circuit controlling device comprising in combination, a housing providing an apertured flange; a cover plate of insulating material for said housing and attached to the flange thereof; contacts on the one side of the plate, electrically connected with terminals on the other side of the plate; an extending portion of the housing, apertured to receive a wire conduit; a bracket secured to the plate and extending through the aperture in the housing flange, said bracket having a terminal on the opposite side of the plate, connected therewith; and a cap providing an enclosure for the terminals, said cap fitting about the extending portion and upon the cover plate to which it is secured.

11. A circuit controlling device comprising in combination, a housing providing an apertured flange; a cover plate of insulating material for said housing and attached to the flange thereof; contacts on the one side of the plate, electrically connected with terminals on the other side of the plate; an extending portion on the housing, apertured to receive a wire conduit; a bracket secured to the plate and extending through the aperture in the housing flange, said bracket having a terminal on the opposite side of the plate, connected therewith; an electrical work device carried by said bracket; and a cap adapted to rest upon the cover plate and be secured thereto, said cap providing an enclosure for the terminals on said plate.

In testimony whereof I hereto affix my signature.

HARRY E. NORVIEL.